(12) United States Patent
Faubert et al.

(10) Patent No.: US 7,168,753 B1
(45) Date of Patent: Jan. 30, 2007

(54) DOOR FOR A VEHICLE

(75) Inventors: Robert J Faubert, Rochester Hills, MI (US); Robert R Lazarevich, Rochester, MI (US); Richard A Manning, Sterling Heights, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 11/220,335

(22) Filed: Sep. 6, 2005

(51) Int. Cl.
*B60J 5/04* (2006.01)

(52) U.S. Cl. .................................. 296/146.12; 296/155

(58) Field of Classification Search ............. 296/146.1, 296/155, 146.12, 50, 51, 146.8, 146.11
See application file for complete search history.

(56) References Cited

U.S. PATENT DOCUMENTS

| | | | | |
|---|---|---|---|---|
| 3,387,406 A | * | 6/1968 | Coker et al. ................... 296/50 |
| 3,400,974 A | * | 9/1968 | Gage ...................... 296/146.12 |
| 3,749,440 A | * | 7/1973 | Lathers ........................ 296/51 |
| 4,076,301 A | * | 2/1978 | Gergoe ........................ 296/50 |
| 5,685,594 A | * | 11/1997 | Harper ........................ 296/51 |
| 2003/0218358 A1 | * | 11/2003 | Hahn ......................... 296/155 |
| 2005/0264027 A1 | * | 12/2005 | Howard ................... 296/146.1 |

* cited by examiner

*Primary Examiner*—Jason Marrow
(74) *Attorney, Agent, or Firm*—Thomas A. Jurecko (57) ABSTRACT

A door for a vehicle includes a door component, a first connection that connects the door component to the vehicle and allows the door component to move along a first path, and a second connection that connects the door component to the vehicle and allows the door component to move along a second path. The second path is different from the first path.

25 Claims, 9 Drawing Sheets

DOOR FOR A VEHICLE

FIELD OF INVENTION

The present invention relates generally to a door system for a vehicle and, more particularly, to a door system attachment arrangement for a vehicle.

BACKGROUND

Vehicles typically employ a number of different door configurations to permit a vehicle operator, passenger or cargo ingress or egress. Different door configurations are used to accommodate for different vehicle styles. For example, gull wing doors are employed on some sports vehicles to assist a driver or passenger in getting in or out of a vehicle that is low to the ground. Sliding doors are provided on some minivans to allow large items to be moved in or out of the vehicle. Although specific door configurations may provide specific advantages, many door designs have drawbacks. For example, while gull wing doors assist a vehicle driver or passenger in getting in and out of a low riding vehicle, such doors make it difficult to move large objects in and out of the vehicle. Likewise, other door configurations have known shortcomings.

SUMMARY

A door for a vehicle includes a door component, a first connection that connects the door component to the vehicle and allows the door component to move along a first path, and a second connection that connects the door component to the vehicle and allows the door component to move along a second path. The second path is different from the first path.

BRIEF DESCRIPTION OF THE DRAWINGS

The present invention will now be described, by way of example, with reference to the accompanying drawings, in which.

DETAILED DESCRIPTION

Figure 1:
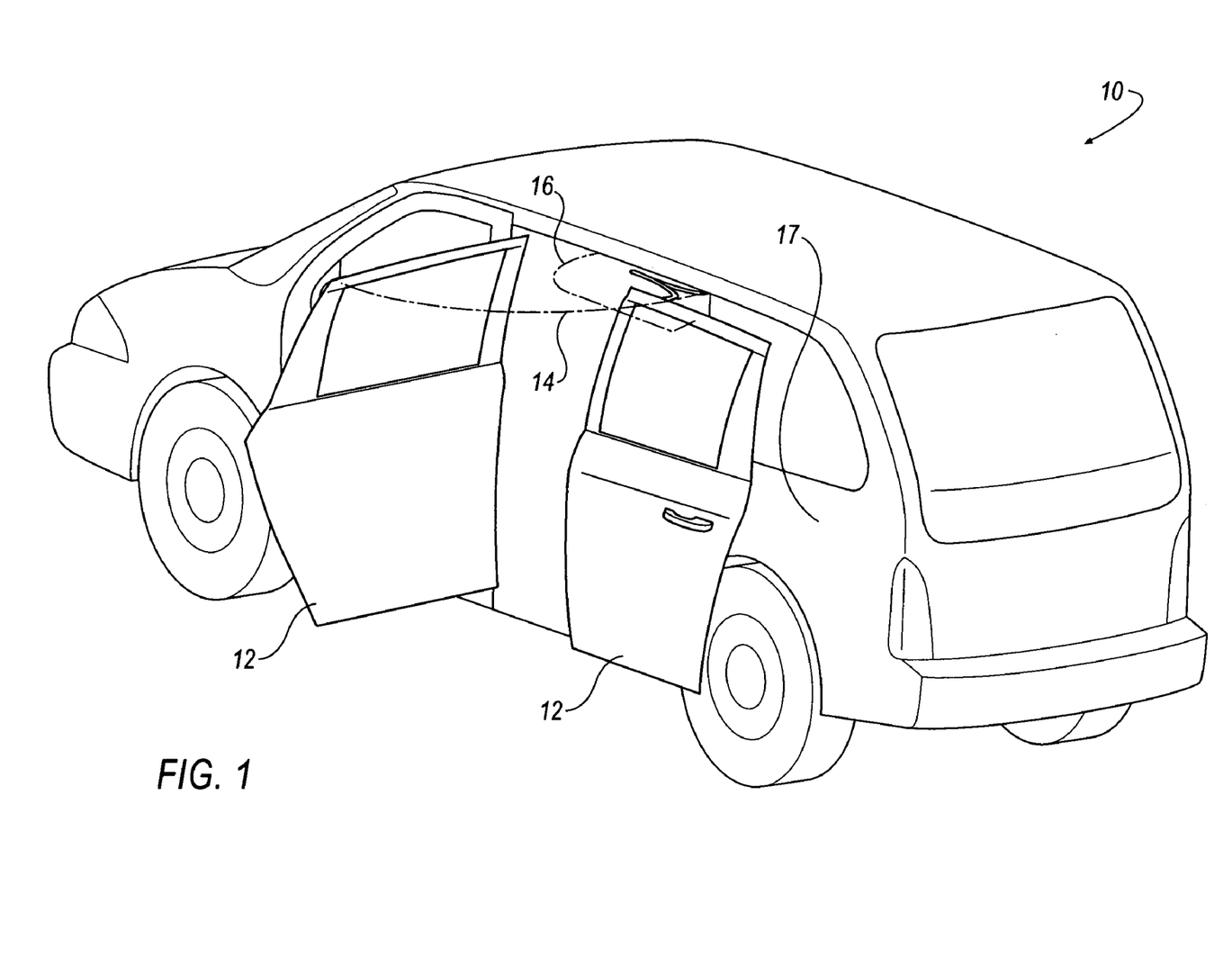
FIG. 1 is an isometric view of a vehicle employing a door for a vehicle according to an embodiment of the invention.
Figure 2:
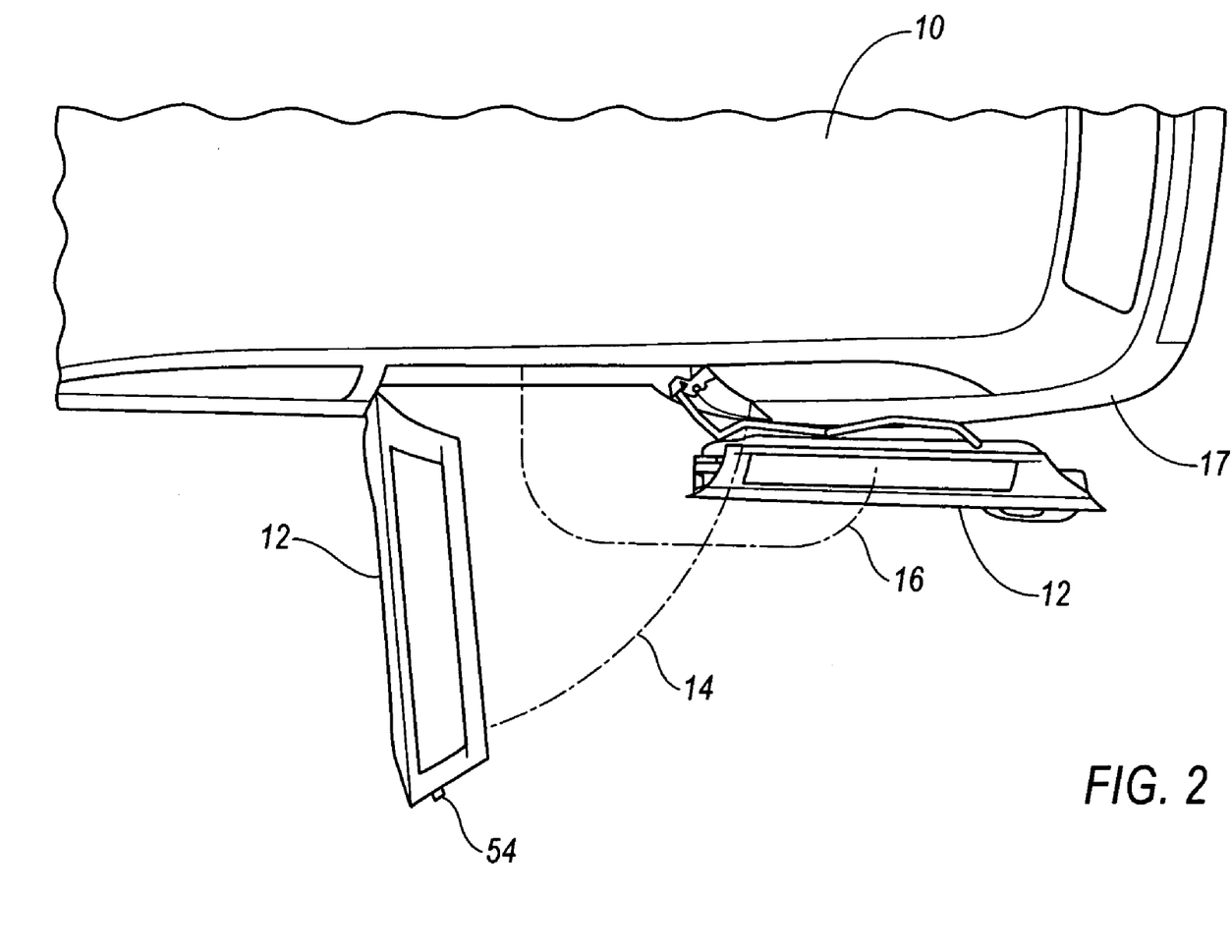
FIG. 2 is a partial top view of a vehicle employing a door for a vehicle according to an embodiment of the invention.

Referring now to FIGS. 1 and 2, a vehicle 10 is shown with a door 12 according to an embodiment of the invention. FIG. 1 illustrates an isometric view of the vehicle 10 and door 12 while FIG. 2 illustrates a partial top view of the vehicle 10 and door 12. As shown in FIGS. 1 and 2, the door 10 is able to move along a first path 14 or a second path 16. The first path 14 allows the door 12 to angularly open between a closed and open position. The second path 16 is a path that allows the door 12 to move between a close position to a rearward position that is substantially parallel with a rear panel 17 of the vehicle 10. In an embodiment, the door 12 remains substantially parallel to the rear panel 17 when traveling along the second path 16. Such a path 16 reduces the amount of room needed on the side of the vehicle 10 for opening and closing the door 12 in comparison to the room needed when the door 12 moves along the first path 14. Additionally, path 16 allows large items to be moved in or out of the vehicle 10 by virtue of the door 12 residing substantially away from the door aperture. Of course, it will be understood that the embodiments of the invention are not limited to such features or the illustrated directions of first path 14 or second path 16, and the present invention contemplates additional directions and paths along which the door 12 may travel.

Figure 3:
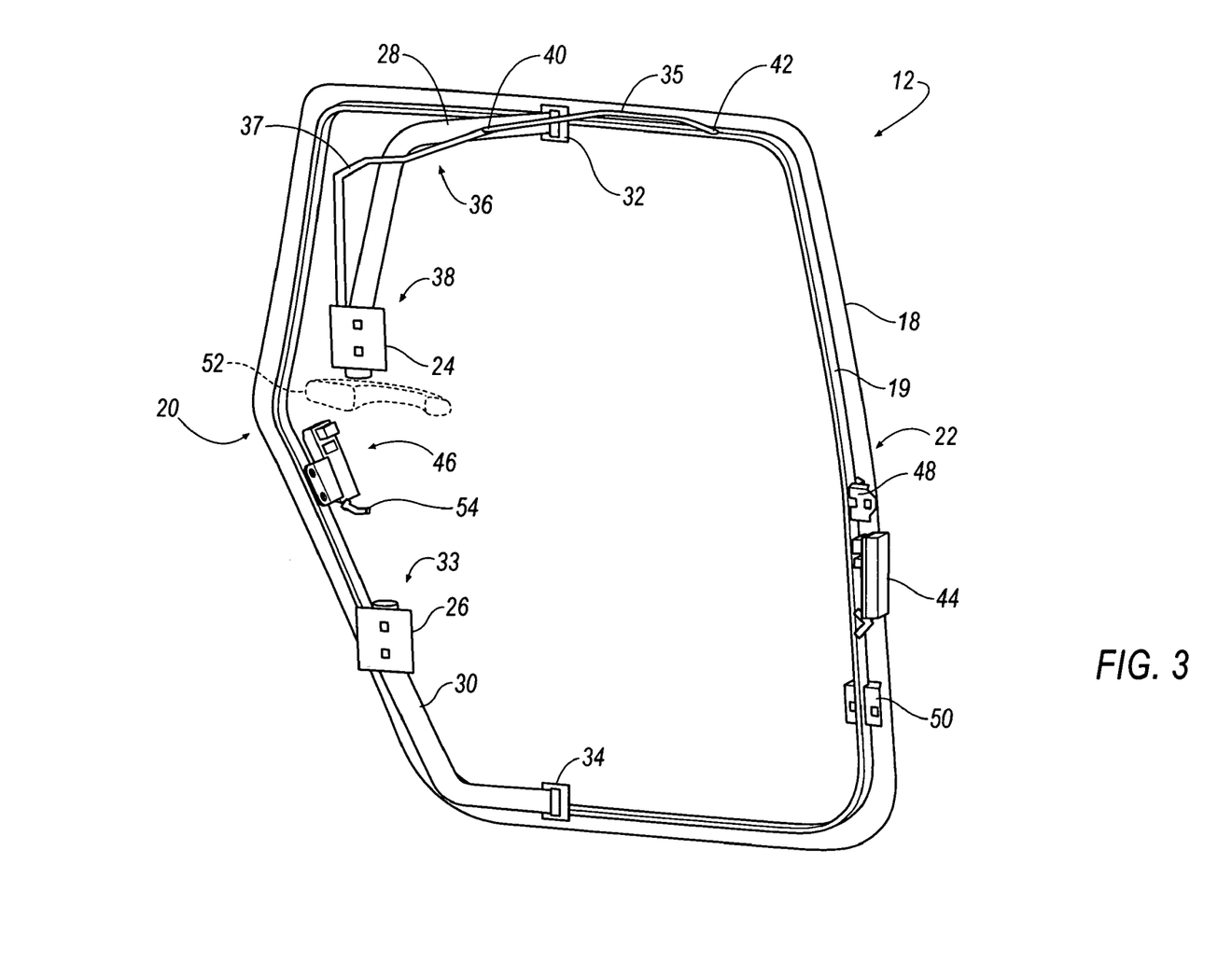
FIG. 3 is an isometric view of a door for a vehicle according to an embodiment of the invention.

Referring now to FIG. 3, a door 12 according to an embodiment of the invention is shown and described. In FIG. 3, the door 12 includes a door panel 18 supported by a door frame 19. In an embodiment, the door panel 18 is any known door panel configuration. The door frame 19 is a rigid piece of support material positioned at a periphery of the door panel 18. In an embodiment, the door frame 19 provides rigid support to the door panel 18 such that, when the door 12 is in an open position, the door 12 does not sag or list. Such support, in an embodiment, assists in aligning any latching mechanisms (as will be described) to allow the door to be closed and latched. The door 12 includes various door edges, such as door edge 20 and 22 that define edges of the doors where latching mechanisms may be located (as will be discussed).

In an embodiment, the door 12 is connected to the vehicle 10 at upper body connection 24 and lower body connection 26 as well as frame latch 44. Upper body connection 24 and lower body connection 26 connect to door frame 19 by way of upper linkage 28 and lower linkage 30 respectively. Upper linkage 28 connects to upper body connection 24 at hinge connection 38. Likewise upper linkage 28 connects to door frame 19 by hinge connection 32. Similarly, lower linkage 30 connects to lower body connection 26 by hinge connection 33 and connects to door frame 19 by hinge connection 34. The hinge connections 38, 33, 32 and 34 cooperate with the shape of the linkage 28 and 30 to allow the linkage 28 and 32 to rotate about hinge connections 38 and 33 to move the door 12 left or right along the second path 16 (see FIGS. 1 and 2) with respect to the illustration of FIG. 3.

With continued reference to FIG. 3, guidance linkage 36 is provided that includes link 35 and link 37. Link 35 is in connected to the door frame 19 at hinge connection 42. Link 37 is connected to upper body connection 24 by hinge connection 38. Link 37 and link 35 are connected to each other by hinge connection 40. As such, guidance linkage 36 is movable about hinge connections 38, 40 and 42. In an embodiment, guidance linkage 36 assists the door 12 in moving in a parallel fashion with respect to the rear panel 17 (see FIG. 1) by providing a parallel linkage structure with that of upper linkage 28 and lower linkage 30.

In an embodiment, the door panel 18 is connected to the door frame 19 by door panel latch 46 and frame hinges 48 and 50. Accordingly, disengagement of the door panel latch 46 allows the door panel 18 to swing about frame hinges 48 and 50 thereby allowing the door panel 18 to move along first path 14 (see FIGS. 1 and 2) while the door frame 19 remains latched to the vehicle 10. Likewise, engagement of the door panel latch 46 secures the door panel 18 with the door frame 19, such that the door panel 18 is prohibited from traveling along first path 14.

A handle 52 is provided to allow selective actuation between either frame latch 44 or door panel latch 46. More specifically, if a user desires for the handle 52 to actuate the door panel latch 46 to allow the door panel 18 to travel along the first path 14, a switch such as switch 54 (see FIG. 2) may be actuated to allow the door handle 52 to actuate the door panel latch 46 and disallow the door handle 52 from actuating the frame latch 44. Thus, actuation of the door handle 52 releases the door panel latch 46 to allow the door panel 18 to travel a long the first path 14.

Likewise, if it is desired for the door handle 52 to actuate the frame latch 44 to allow the door 12 to travel along the second path 16, the switch 54 may be selected to allow the door handle 52 to actuate the frame latch 44 and to disallow the door handle 52 from actuating the door panel latch 46. Thus, actuation of the door handle 52 releases the frame latch 44 to allow the door 12 to travel along the second path 16. In one embodiment, a mechanism such as that disclosed in U.S. Pat. No. 6,276,743 B1 may be used to switch the door handle 52 from actuating frame latch 44 or door panel latch 46. U.S. Pat. No. 6,276,743 B1 is assigned to the assignee of the present application, and the entirety of which is incorporated herein by reference.

With continued reference to FIG. 3, the door panel 18 and door frame 19 form an assembly that is latched to the vehicle 10 (see FIGS. 1 and 2) by frame latch 44. The frame latch 44 latches the door frame 19 to the vehicle 10 while the door panel latch 46 latches the door panel 18 to the door frame 19. As such, when the frame latch 44 is released, the assembly formed of the door panel 18 and door frame 19 is permitted to move along second path 16 (see FIGS. 1 and 2). When the door panel latch 46 is released, the door panel 18 is permitted to move while the door frame 19 remains latched to the vehicle 10.

Figure 4:
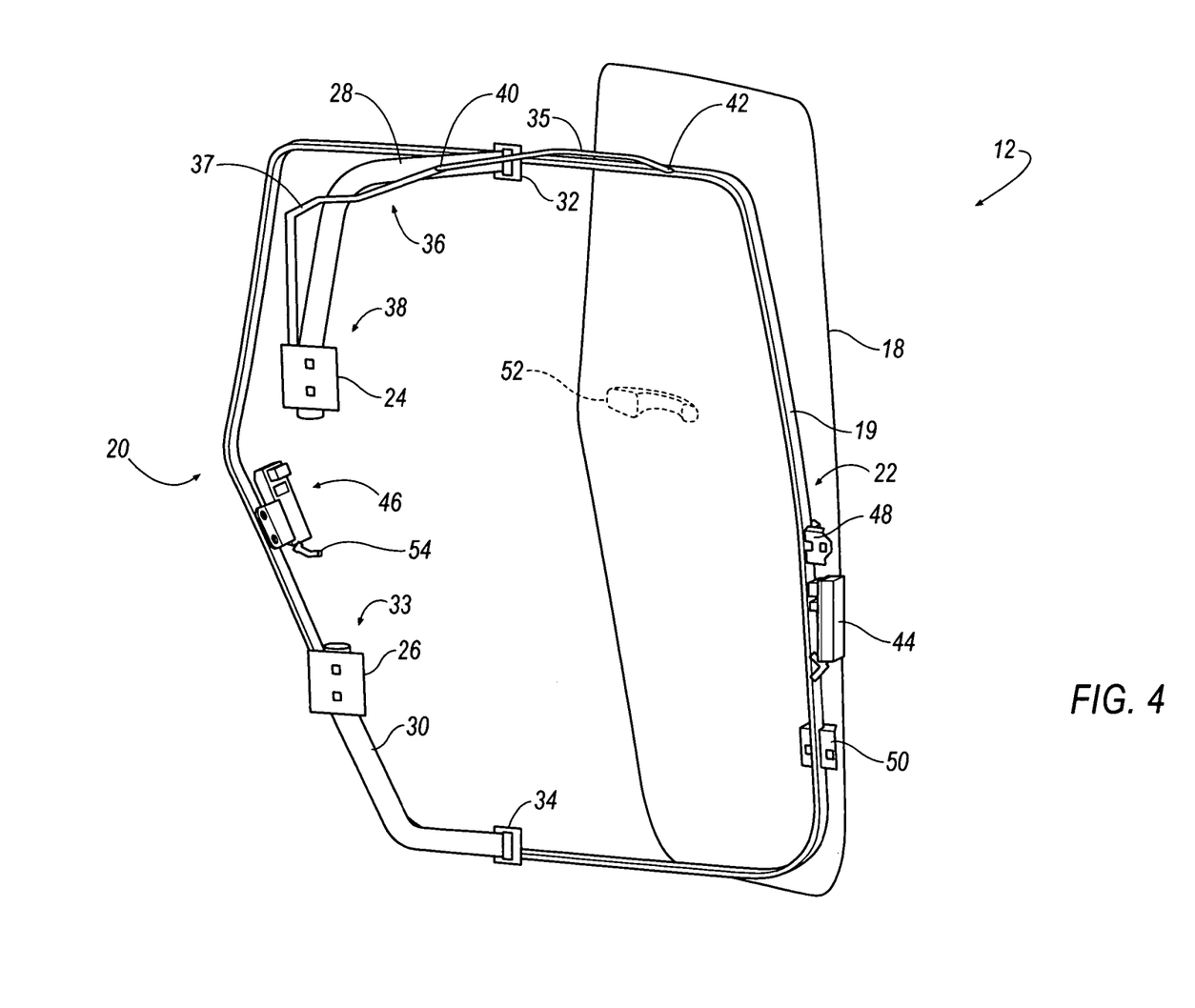
FIG. 4 is an isometric view of a door for a vehicle according to an embodiment of the invention.
Figure 5:
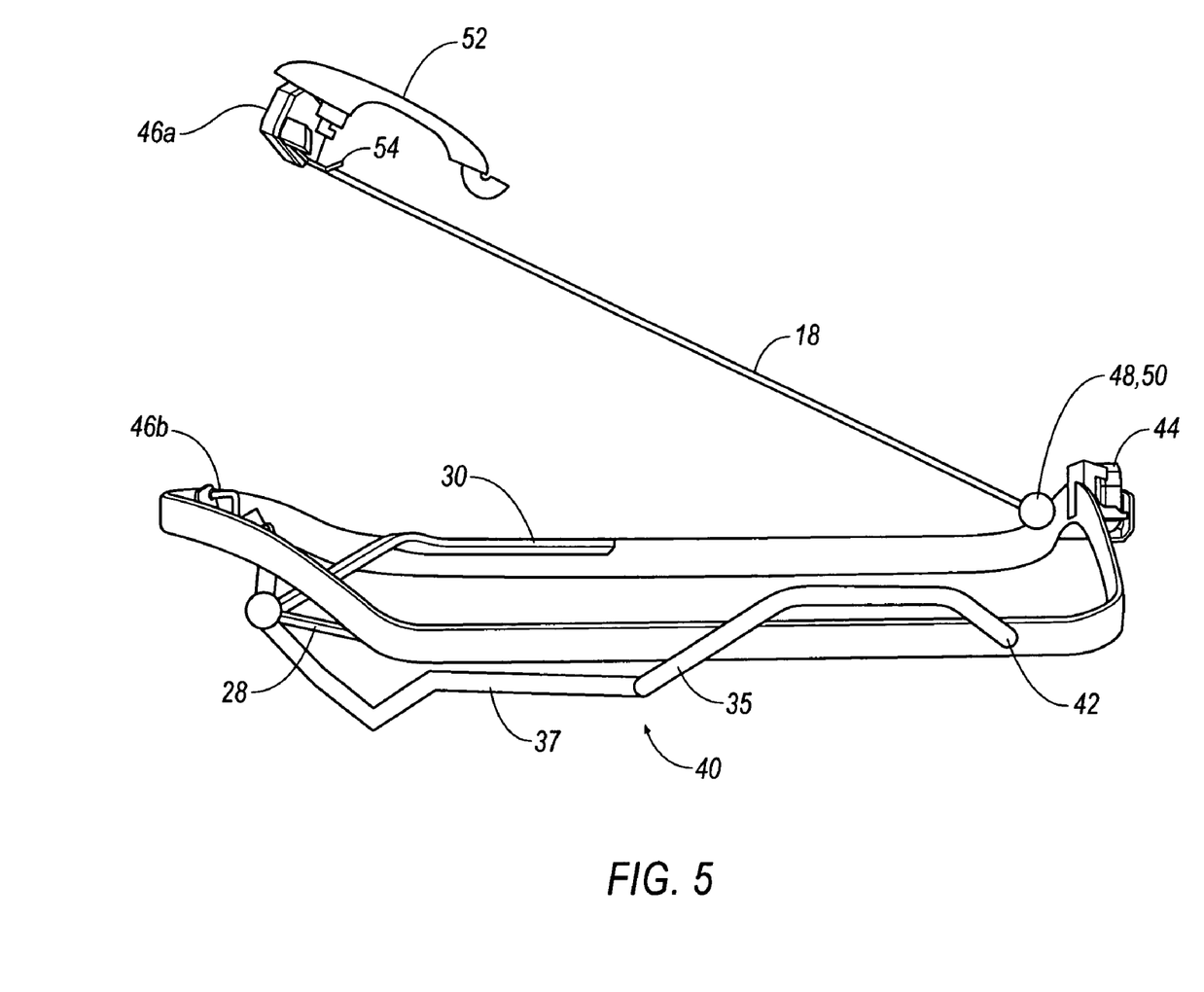
FIG. 5 is a top view of a door for a vehicle according to an embodiment of the invention.

Referring now to FIGS. 3–9, the operation according to an embodiment of the invention is shown and described. In FIG. 3, the door 12 is shown in its closed position. Here, door panel latch 46 latches the door panel 18 to the door frame 19 and frame latch 44 latches the door frame 19 to the vehicle 10. When the door panel 18 is to be moved along the first path 14, the door handle 52 is actuated while the switch 54 is in a position to allow the door handle 52 to release the door panel latch 46. Next, as shown in FIGS. 4 and 5, the door handle 52 is pulled away from the vehicle 10 until the door panel is at the desired angular position.

Figure 6:
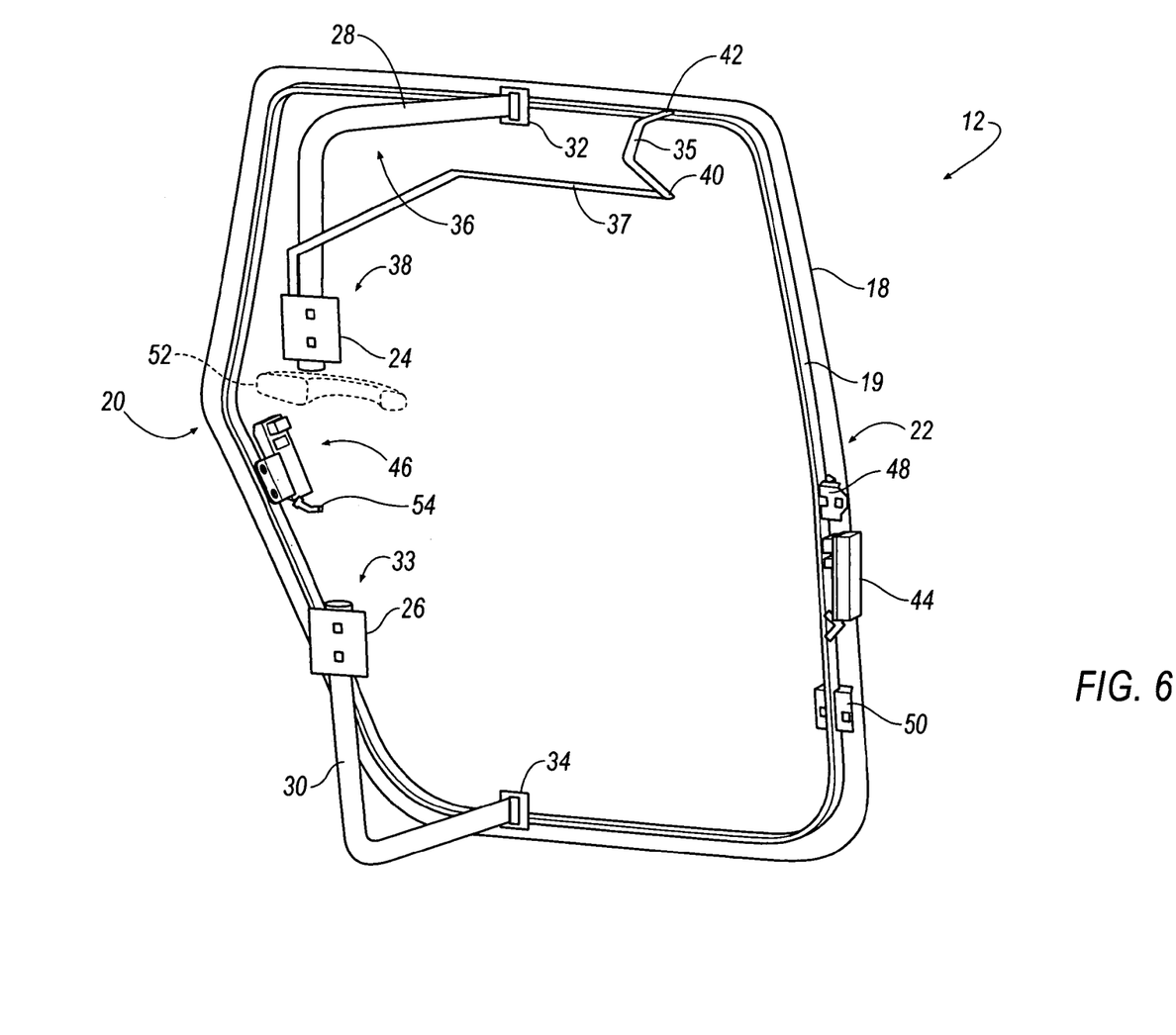
FIG. 6 is an isometric view of a door for a vehicle according to an embodiment of the invention.
Figure 7:
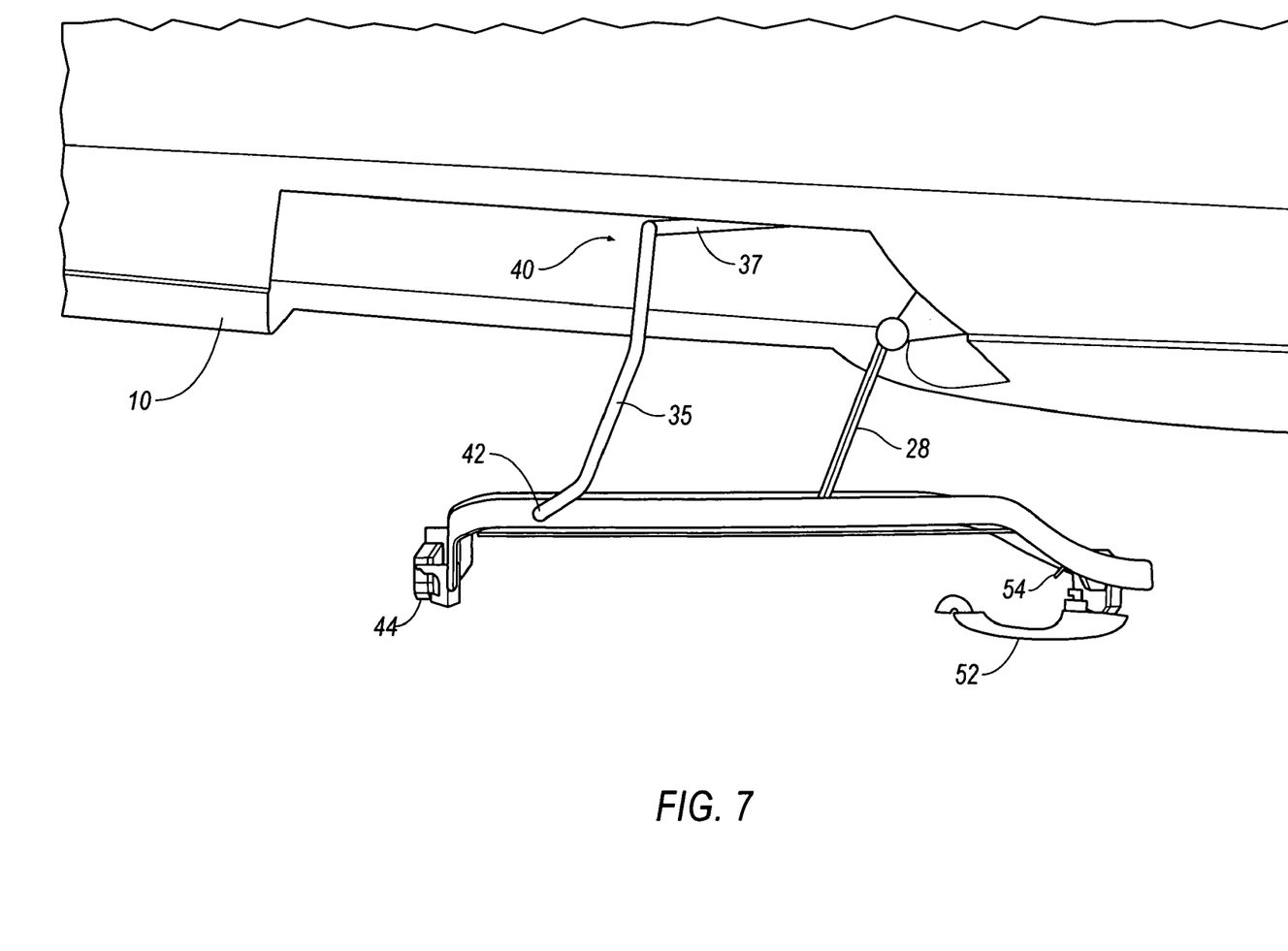
FIG. 7 is a partial top view of a door for a vehicle according to an embodiment of the invention.
Figure 8:
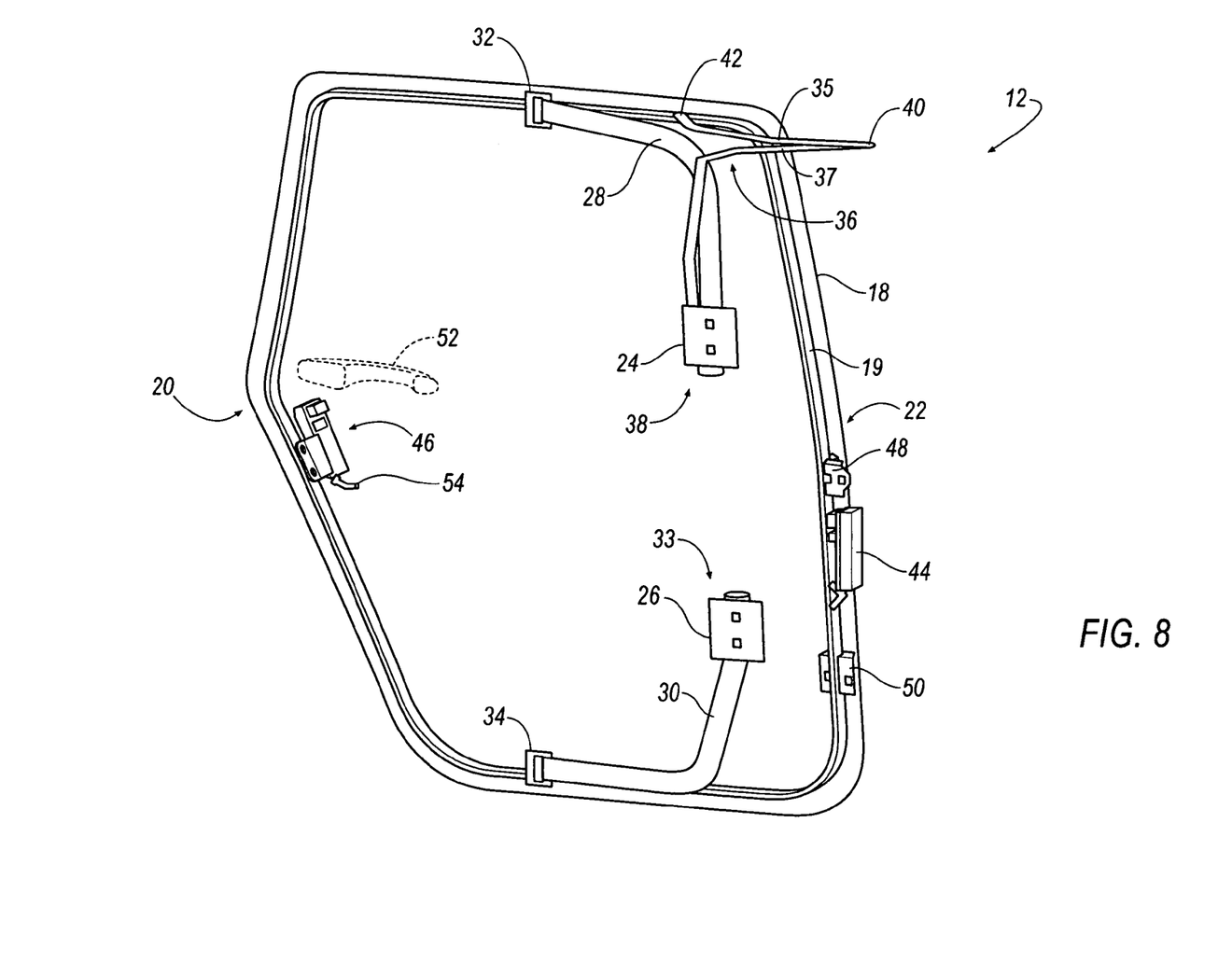
FIG. 8 is an isometric view of a door for a vehicle according to an embodiment of the invention.
Figure 9:
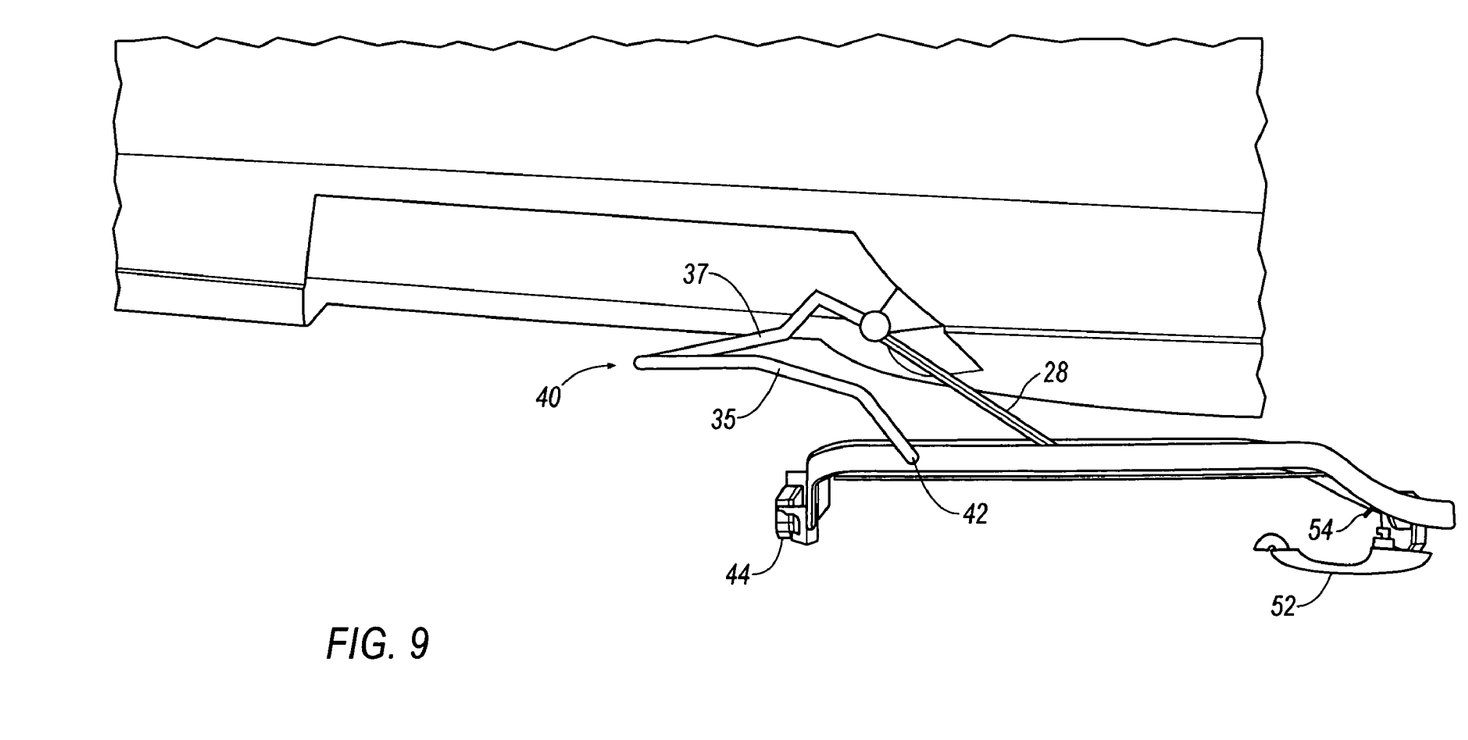
FIG. 9 is a partial top view of the door for a vehicle according to an embodiment of the invention.

When the door 12 is to be moved along the second path 16, the door handle 52 is actuated while the switch 54 allows the door handle 52 to release the frame latch 44. As shown in FIGS. 6 and 7, the door 12 is pulled all way and toward the back of the vehicle 10. This motion causes the upper linkage 28, lower linkage 30 and link 35 to rotate in a counterclockwise direction with respect to that shown in FIG. 7. Such action causes the door 12 to move away and back along the vehicle 10 in a parallel fashion with respect to the rear panel 17. With continued movement of the door 12 toward the rear of the vehicle 10, upper linkage 28 and lower linkage 30 continue to rotate counterclockwise with respect to FIG. 7. Additionally, link 37 rotates counterclockwise slightly to assist in moving the door 12 back along the vehicle 10 in a fashion parallel to the rear panel 17. Once all the way back, the door 12 is positioned as shown in FIGS. 8 and 9. It will be understood that, for the embodiments described with respect to FIGS. 3–9, the reverse of the operation described above may be used to move the door 12 to a close position.

In an embodiment, the first connection 24 and the second connection 26 are effective for maintaining the door in a substantially vertical orientation throughout its traversal of the first 14 and second 16 paths.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A door for a vehicle, comprising:
   a door component;
   a first connection that connects the door component to the vehicle and allows the door component to pivot and move along a first path, the first connection including at least a first hinge connection having a first center of rotation; and
   a second connection that connects the door component to the vehicle and allows the door component to pivot and move along a second path, the second connection including at least a second hinge connection having a second center of rotation;
   wherein the door component is substantially parallel to a panel of the vehicle during movement along the second path; and
   wherein the first center of rotation is different from the second center of rotation.

2. The door according to claim 1, wherein:
   the first path defines an angular path traveled by the door component about the first hinge; and wherein
   the second path defines a non-angular path traveled by the door component between a closed position and a position wherein the door component is adjacent to the panel of the vehicle.

3. The door according to claim 2, wherein the door component further includes:
   a door panel; and
   a door frame disposed on at least a portion of an outer periphery of the door panel.

4. The door according to claim 3, further comprising:
   a first latch that detachably connects the door frame to the vehicle at a first location; and
   a second latch that detachably connects the door panel to the door frame at a second location.

5. The door according to claim 4, wherein:
   the door component includes at least a first door edge and a second door edge; wherein
   the first door edge and said second door edge are located on substantially opposite sides of the door component; wherein the first latch is located at the first door edge; and wherein the second latch is located at the second door edge.

6. The door according to claim 4, further including:
a door handle; and
an actuator switchable between at least a first position and a second position;
wherein the door handle is able to release the first latch when the actuator is in the first position; and
wherein the door handle is able to release the second latch when the actuator is in the second position.

7. The door according to claim 6, wherein:
the door is able to travel along the first path when the actuator is in the first position; and
wherein the door is able to travel along the second path when the actuator is in the second position.

8. The door according to claim 3, further including:
a linkage having a first end pivotally connected to the second hinge and a second end pivotally connected to the door component;
wherein the linkage is adapted to maintain the movement of the door component along the second path.

9. The door according to claim 8, further including a guidance linkage connected between the door component and the vehicle that is adapted to cause the door component to move along the second path while the door component remains substantially parallel to the side panel.

10. The door according to claim 9, wherein the guidance linkage further includes:
the first link pivotally connected to the door component; and
a second link pivotally connected to the vehicle;
wherein the first link is pivotally connected to the second link.

11. The door according to claim 1, wherein said first connection and said second connection maintain said door component in a substantially vertical orientation throughout its traversal of the first and second path.

12. A vehicle, comprising:
a vehicle component;
a door component connected to the vehicle component;
a first connection that connects the door component to the vehicle component and allows the door component to pivot and move along a first path, the first connection including at least a first hinge connection having a first center of rotation; and
a second connection that connects the door component to the vehicle component and allows the door component to pivot and move along a second path, the second connection including at least a second hinge connection having a second center of rotation;
wherein the door component is substantially parallel to a panel of the vehicle during movement along the second path; and
wherein the first center of rotation is different from the second center of rotation.

13. The vehicle according to claim 12, wherein:
the first path defines an angular path traveled by the door component about the first hinge; and
the second path defines a non-angular path traveled by the door component between a closed position and a position where the door component is adjacent to the panel of the vehicle component.

14. The vehicle according to claim 13, wherein the door component further includes:
a door panel; and
a door frame disposed on at least a portion of an outer periphery of the door panel.

15. The vehicle according to claim 14, further including:
a first latch that detachably connects the door frame to the vehicle at a first location; and
a second latch that detachably connects the door panel to the door frame at a second location.

16. The vehicle according to claim 15, wherein:
the door component includes at least a first door edge and a second door edge; wherein
the first door edge and said second door edge are located on substantially opposite sides of the door component; wherein
the first latch is located at the first door edge; and wherein the second latch is located at the second door edge.

17. The vehicle according to claim 15, further including:
a door handle;
an actuator switchable between at least a first position and a second position;
wherein the door handle releases the first latch when the actuator is in the first position; and
wherein the door handle releases the second latch when the actuator is in the second position.

18. The vehicle according to claim 17, wherein:
the door is able to travel along the first path when the actuator is in the first position; and
wherein the door is able to travel along the second path when the actuator is in the second position.

19. The vehicle according to claim 14, further including;
a linkage having a first end pivotally connected to the second hinge and a second end pivotally connected to the door component;
wherein the linkage is adapted to maintain the movement of the door component along the second path.

20. The vehicle according to claim 19, further including a guidance linkage connected between the door component and the vehicle component, wherein the support linkage that is adapted to maintain the movement of the door component along the second path while the door component remains substantially parallel to the side panel.

21. The vehicle according to claim 20, wherein the guidance linkage further includes:
a first link pivotally connected to the door component; and
a second link pivotally connected to the vehicle component;
wherein the first link is pivotally connected to the second link.

22. A vehicle comprising:
a vehicle component;
a door component connected to the vehicle component and having a first hinge and a second hinge, the first hinge and the second hinge being disposed on opposite sides of the door component;
a first connection that connects the door component to the vehicle component and allows the door component to pivot about the first hinge and move along a first path; and
a second connection that connects the door component to the vehicle component and allows the door component to pivot about the second hinge and move along a second path;
wherein the second path is different from the first path; and
wherein the door component is substantially parallel to a panel of the vehicle during movement along the second path.

23. The vehicle of claim 22, wherein the first path defines an angular path traveled by the door component about the first hinge and the second path defines a first position and a second position where the door component is adjacent to the panel of the vehicle component.

24. The vehicle of claim 22, wherein the door component further includes a door panel and a door frame disposed on at least a portion of an outer periphery of the door panel.

25. The vehicle of claim 24, further comprising a first latch that detachably connects the door frame to the vehicle at a first location and a second latch that detachably connects the door panel to the door frame at a second location, the first latch being disposed on an opposite side of the door component from the second latch.

* * * * *